(12) United States Patent
Kapp

(10) Patent No.: US 10,438,110 B2
(45) Date of Patent: Oct. 8, 2019

(54) MULTIPLE FREQUENCY TRANSPONDER WITH A SINGLE ANTENNA

(71) Applicant: ASSA ABLOY AB, Stockholm (CH)

(72) Inventor: Hugo Kapp, Stockholm (CH)

(73) Assignee: ASSA ABLOY AB, Stockholm (SE)

( * ) Notice: Subject to any disclaimer, the term of this patent is extended or adjusted under 35 U.S.C. 154(b) by 65 days.

(21) Appl. No.: 15/197,110

(22) Filed: Jun. 29, 2016

(65) Prior Publication Data
US 2017/0011287 A1    Jan. 12, 2017

(30) Foreign Application Priority Data
Jul. 8, 2015 (CH) .................................... 0984/15

(51) Int. Cl.
G06K 19/077 (2006.01)
G06K 19/07 (2006.01)
G06K 7/10 (2006.01)
H04B 5/00 (2006.01)

(52) U.S. Cl.
CPC ... *G06K 19/07794* (2013.01); *G06K 7/10237* (2013.01); *G06K 19/072* (2013.01); *G06K 19/0723* (2013.01); *G06K 19/0724* (2013.01); *G06K 19/07767* (2013.01); *H04B 5/0062* (2013.01); *H04B 5/0081* (2013.01)

(58) Field of Classification Search
USPC ........................................................ 235/492
See application file for complete search history.

(56) References Cited

U.S. PATENT DOCUMENTS

| | | | |
|---|---|---|---|
| 5,955,723 A | 9/1999 | Reiner | |
| 7,163,155 B2 * | 1/2007 | Briancon | H01L 23/5227 235/449 |
| 2009/0153303 A1 | 6/2009 | Forster | |
| 2009/0224058 A1 * | 9/2009 | Savry | G06K 19/072 235/492 |
| 2012/0019363 A1 | 1/2012 | Fein | |
| 2014/0246503 A1 * | 9/2014 | Hofer | G06K 19/07794 235/492 |
| 2015/0053772 A1 * | 2/2015 | Holweg | G01N 33/00 235/492 |

FOREIGN PATENT DOCUMENTS

| | | |
|---|---|---|
| EP | 0875039 | 11/1998 |
| EP | 0931295 | 7/1999 |
| EP | 0977145 | 2/2000 |
| EP | 1325468 | 7/2003 |
| EP | 2535848 | 12/2012 |
| WO | WO 2007/026077 | 3/2007 |

OTHER PUBLICATIONS

Extended European Search Report for European Patent Application No. 16177454.2, dated Nov. 16, 2016, 6 pages.

* cited by examiner

*Primary Examiner* — Michael G Lee
*Assistant Examiner* — David Tardif
(74) *Attorney, Agent, or Firm* — Schwegman Lundberg & Woessner, P.A.

(57) ABSTRACT

The present invention concerns a RFID transponder, such as a card, comprising a first chip electrically connected to a first antenna and a second chip electrically connected to a second antenna. The first antenna comprises a secondary antenna which is inductively to the second antenna.

19 Claims, 4 Drawing Sheets

MULTIPLE FREQUENCY TRANSPONDER WITH A SINGLE ANTENNA

CROSS-REFERENCE TO RELATED APPLICATIONS

This application claims the benefit of Swiss National application No. CH00984/15 filed Jul. 8, 2015, the entire contents of which are incorporated herein by reference.

FIELD OF THE INVENTION

The present invention concerns a transponder able to work in several frequency modes, for example in high frequencies (HF) and ultra-high frequencies (UHF), and using the principle of a coupling device as described in detail hereunder. The transponder may be, for example, included in a card such as a smart card or payment card, or may be used to form a card such as a smart card or payment card.

DISCUSSION OF THE BACKGROUND ART

In the art of RFID, a coupling device for a transponder (such as a RFID transponder) generally comprises a primary antenna configured for long range communication with an external RFID reader and a secondary antenna connected in series, wherein the secondary antenna is configured as such to be inductively coupled to an antenna of the transponder device for example a chip or chip module. Such a coupling device is generally called a booster or a booster antenna.

It is noted that the term 'chip' and 'chip module' can be interchanged throughout this document as a chip module generally includes a chip.

Inductive coupling, also called magnetic, capacitive or reactive coupling, is defined in contrast to direct electrical coupling by electrically conductive material. References in the present description to inductive, magnetic, capacitive or reactive coupling refer to a coupling that is predominantly or primarily inductive, magnetic, capacitive or reactive. It will be appreciated that a coupling that is primarily inductive may also include some capacitive coupling. Conversely, a coupling that is primarily capacitive may also include some inductive (magnetic) coupling as a secondary coupling mechanism. Systems using primarily inductive coupling are referred to herein as inductive coupling, and systems using primarily capacitive coupling are referred to herein as capacitive coupling.

This technology has been extensively used for manufacturing non-contact cards. An example, is illustrated in U.S. Pat. No. 5,955,723. A transponder unit comprises a chip with an antenna and a booster antenna, comprising a primary antenna and a secondary antenna connected in series. All the elements are integrated in the card body and aim to extend the range and the quality of the communication of the transponder unit, in particular in the case of a non-contact card.

A similar approach for RFID smart card is described in EP 0 931 295. A module is provided with an antenna on the module, and the module is fixed in a recess of the card substrate accommodated with an inductive booster antenna. The mounting is achieved in such a way that the antenna on the module is inductive coupled with the secondary antenna of the booster. Similar modules with antenna are disclosed in EP 0 875 039 and WO 07 026 077. This solution is particularly interesting for dual (contact and non-contact) interface modules.

An alternative is presented in EP 0 977 145, where an antenna is formed directly on the surface of the chip, when the primary and secondary antennas of the coupling device are formed on a module board on which the chip is going to be mounted by the flip-chip method. This kind of small transponders (chip and antenna together) is called coil-on-chip and is known in the art and largely distributed on the market.

In all the documents of the prior art cited above, a booster working with a transponder unit is proposed. The chip is electrically connected to the larger antenna (the primary antenna of the booster or coupling device) without physical connection. Such units are much more resistant to mechanical stress than the ones using traditional connecting means such as pads, studs or wires. The antenna of the transponder is kept small (about the size of the chip or of the module) and is mounted on the same rigid structure as the chip. It can be the chip itself or in/on the chip packaging (as a chip module).

All configurations disclosed above, also as dipole, patch, slot, spiral, wire, single-loop, multi-loops and various hybrid antenna types are suitable for such inductive coupling systems. The mechanism for generating the magnetic field in the magnetic coupling device may vary based on the antennas type or configuration. All types of coupling, at low frequency (LF: 30-300 kHz), high frequency (HF: 3-30 MHz) or ultra-high frequency (UHF: over 300 MHz), are possible.

A key issue of this technology is to find a simple and effective mass production process to manufacture the booster. The problem is that all elements of the booster have to be tuned accurately in order to obtain the desired transmission characteristic and performance of the whole system (booster+transponder device). This is illustrated for example in the equation giving the mutual inductance in EP 1 325 468.

Many solutions are proposed today that all involve a multiple step manufacturing process.

One solution (used for example by Smart Packaging Solutions, France) is to use an etched antenna on a core sheet of dielectric material. Two extremities of the antenna, one on each side of the sheet, are enlarged to form the opposing electrode surface of a capacitor. By choosing accurately the two surface ratio, one can tune the capacitance of the element. A drawback of this method is that the antenna paths on each side of the sheet have to be connected electrically through the sheet.

Other solutions like connecting capacitors, closing antenna loops, etc . . . all imply additional manufacturing steps, most of the time with high technical difficulties and error potential. This complexity implies lower reproducible and quality yield that are essential drawbacks for mass production.

Further, it has been tried in the past to combine HF and UHF transmission modes on the same transponder (for example a card) and solutions have been developed in the art.

For example, FIG. 1 illustrates a first solution with two antennas and modules being placed side-by-side. On the top half of the transponder, an HF part of the transponder is illustrated with a chip or chip module 4 being electrically connected to an antenna 2.

On the bottom half of the transponder, an UHF part is illustrated with its booster antenna 3 coupled to a chip module 5 in an inductive manner, as discussed hereabove.

As one can easily see, this configuration of FIG. 1 is problematic as it covers the entire surface of the card and it is not possible to integrate other technologies in the card.

FIG. 2 illustrates a proposed solution in which the UHF antenna and transponder are placed inside of the area covered by the HF antenna. This configuration is interesting as about half of the card is now free but it has a substantive disadvantage: the HF antenna forms a faraday cage when the electrical circuit is closed and this drastically reduces the performance of the UHF part. The read distance is then only a couple of centimeters (up to max. 3 cm) which is neither practical nor acceptable.

SUMMARY

It is an aim of the present invention to improve the known devices and transponder.

A further aim of the present invention is to propose a transponder able to function in several modes, for example in HF and UHF modes.

A further aim of the present invention is to propose a multimode transponder with minimal impact on performance of each individual mode.

According to one aspect of the present invention, an RFID transponder is provided that addresses the above challenges.

The RFID transponder preferably includes a first chip electrically connected to a first antenna and a second chip or electrically connected to a second antenna, where the first antenna comprises a secondary antenna which is inductively connected to the second antenna.

According to the present invention, an idea and solution is to use an antenna of the transponder in multiple frequency communication modes, for example, to use the HF antenna, as a coupling device (as described hereabove) for the UHF mode and to couple the UHF chip or chip module to the HF antenna instead of using a dedicated UHF antenna.

According to an aspect of the present invention, the secondary antenna inductively connected to the second antenna and the first antenna are configured to operate as a booster antenna for the second chip.

According to another aspect of the present invention, the secondary antenna forms a loop antenna separated from the rest of the first antenna and is electrically connected in series with the rest of the first antenna.

According to yet another aspect of the present invention, both the first and second chips are used for HF communication.

According to yet another aspect of the present invention, one of the chips is used for UHF communication.

According to yet another aspect of the present invention, the inductive coupled chip is used for UHF communication.

According to a further aspect of the present invention, the first chip and the first antenna form a first operative tag configured to communicate with an external reader.

According to another aspect of the present invention, the second chip and the second antenna form a second operative tag configured to communicate with an external reader through inductive coupling with the first tag.

According to another aspect of the present invention, the first and second tags are configured to communicate at the same resonance frequency with external readers.

According to another aspect of the present invention, the first and second tags are configured to communicate at different resonance frequencies with external readers.

The above and other objects, features and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

The invention will be better understood from the following description and from drawings which show:

DETAILED DESCRIPTION OF THE SEVERAL EMBODIMENTS

Figure 1:
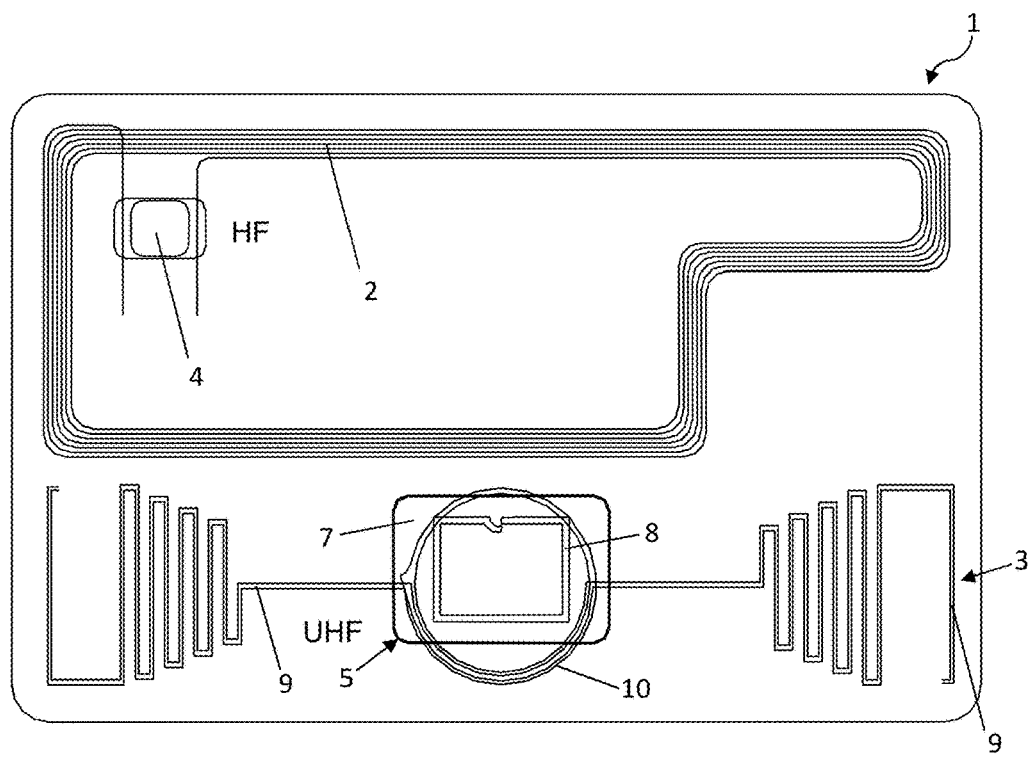
FIG. 1 illustrates a first example of a prior art device.

In FIG. 1, an example of a prior art device is illustrated. It shows an RFID transponder 1, such as a card, comprising two antennas 2, 3, each with a chip or chip module 4, 5. The top antenna 2 with the chip 4 forms an HF communication part and the bottom booster antenna 3 with chip module 5 an UHF communication part.

The HF chip or chip module 4 is directly connected to the antenna 2, for example by pads or studs.

The UHF chip or chip module 5 is connected to the antenna 3 via an inductive coupling as described above. More precisely, the chip module 5 comprises a chip 7 electrically connected to a primary antenna 8 which is integrated in/provided with the chip module. The booster antenna 3 comprises a primary dipole UHF antenna 9, showing two symmetrical parts, and a secondary antenna 10 designed to connect inductively with the antenna 8 of the chip module 5 when it is positioned in its proximity.

As discussed above, FIG. 2 illustrates a second known configuration whereby the UHF communication part (booster antenna 3 and chip module 5) has been moved and is now inside the area limited by the HF antenna 2 such that half the card 1 is free. As mentioned above, this configuration, although interesting on the level of space optimization is problematic as the antenna 2 forms a faraday cage when the chip/chip module 4 is connected to the antenna 2. Hence the UHF read range properties of this configuration are poor and not satisfactory for a public use.

Figure 3:
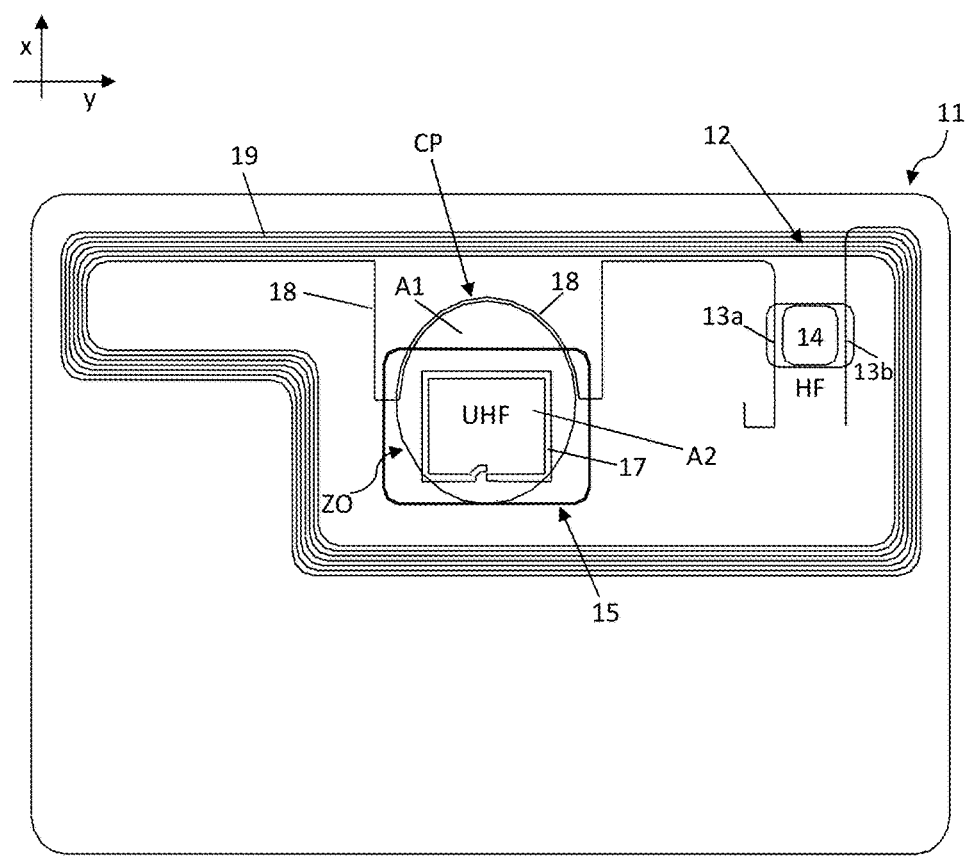
FIG. 3 illustrates a schematical top view of an embodiment according to one aspect of the present invention.

FIG. 3 illustrates an embodiment of a transponder 11, for example, a card or a smart card, according to an aspect of the present invention.

The transponder 11 includes a first antenna 12 and a first chip 14. The first chip 14 is electrically connected to a first antenna 12. The first chip 14 is electrically connected to the first antenna 12 to be directly electrically coupled to the first chip 14 by electrically conductive material. As shown in FIG. 3, the loose extremities 13a, 13b of the continuous first antenna 12 are connected to the first chip 14.

The first antenna 12 is directly and/or physically connected to and/or contacting the first chip 14. The electrical connection is established through a solid medium, for example, by pads or studs in contact with the material of the first antenna 12. That is, the electrical connection is a non-inductive connection or coupling (as discussed in the section relating to the background art).

The transponder 11 further includes a second chip 15 electrically connected to a second antenna 17. The first antenna 12 further comprises a secondary antenna 18 which is inductively connected to the second antenna 17.

The first antenna 12 comprises a principal section 19 and the secondary antenna 18. The secondary antenna 18 extends continuously from the principal section 19 to an inductive connection or coupling zone ZO at which the secondary antenna 18 is inductively connected to the second antenna 17.

The first antenna 12 thus includes a primary antenna 19 configured for long range communication with an external RFID reader and a secondary antenna 18 connected in series to the primary antenna 19, where the secondary antenna 18 is configured to be inductively coupled to the second antenna 17 that is connected to the chip 15. The first antenna 12 is thus configured to function as the booster or booster antenna. The primary antenna 19 and the secondary antenna 18 inductively connected to the second antenna 17 operate as the booster antenna (or coupling device) for the second chip 15.

The inductive connection zone ZO is preferably located above or below the second antenna 17 and is aligned in a substantially planar direction Y of the transponder (see FIGS. 3 and 4) to coincide with or be superposed with the second antenna 17.

The inductive connection zone ZO and the second antenna 17 are, for example, aligned so as to have a common substantially vertical axis VA (see FIG. 4) extending in a Z-direction substantially perpendicular to the plane of extension of the transponder. The common substantially vertical axis VA passes through both the inductive connection zone ZO and a surface area defined by the antenna 17.

The secondary antenna 18 may define, for example, a first area A1 (see FIG. 3) and the second antenna 17 may define a second area A2. Areas A1, A2 include the area delimited by the antenna material itself. The antennas are arranged such that the first area A1 and the second area A2 are aligned in the Y direction one over the other but are separated from one another (in the Z-direction) by a separation material SM (see FIG. 4), for example, made of plastic. The alignment is such that at least a portion of area A2 overlaps with area A1 (or vice-versa) when viewed in the Z-direction.

The portion of area A2 overlapping with area A1 (or vice-versa) is, for example, at least 25% or at least 50% or at least 75% of the total area A2.

Preferably, the structure (geometry and/or dimensions) defined by the antenna 17 is as similar as possible to the structure of a coupling portion CP defined by the secondary antenna 18. When the antenna 17 is positioned over the coupling portion CP of the secondary antenna 18, the antenna material of the antenna 17 and the secondary antenna 18 preferably extend at the smallest possible spacing difference from one another in order to optimize inductive coupling between them.

This nevertheless does not mean that the design of the antenna 17 and of the secondary antenna 18 should be absolutely identical. The design of the secondary antenna 18 is submitted to different constraints than the antenna 17 and depends, for example, on the available space on the substrate, pitch size, and the diameter of the wire used etc. The more portions of the secondary antenna 18 that are parallel and close to portions of the antenna 17, the better the inductive coupling that will be achieved. However, an identical design or structure for both antennas is not necessary. Both antennas can have differences like, for example, physical nature (wire, printed, deposited, . . . ), material, number of turns, pitch, geometry etc.

The transponder 11 represented in FIG. 3 is thus exemplary, and the particular illustrated design of the antennas should not be understood as limiting the scope of the present invention.

The secondary antenna 18 can for example form a loop antenna separated from the principal section 19 and the rest of the first antenna 12 where the loop antenna is electrically connected in series with the rest of the first antenna 12.

The first chip 14 and the first antenna 12 form a first operative tag or device configured to communicate with an external reader (not illustrated). The second chip 15 and the second antenna 17 form a second operative tag configured to communicate with the same or different external reader through inductive coupling with the first tag.

According to an aspect of the present invention, the first chip 14 may be configured for HF communication with an external reader and the second chip 15 may be configured for UHF communication with an external reader. This is the case of the exemplary embodiment of FIG. 3.

However, the present invention is not limited to such communication frequency range combinations. For example, both chips 14, 15 may be configured for HF communication.

Figure 2:
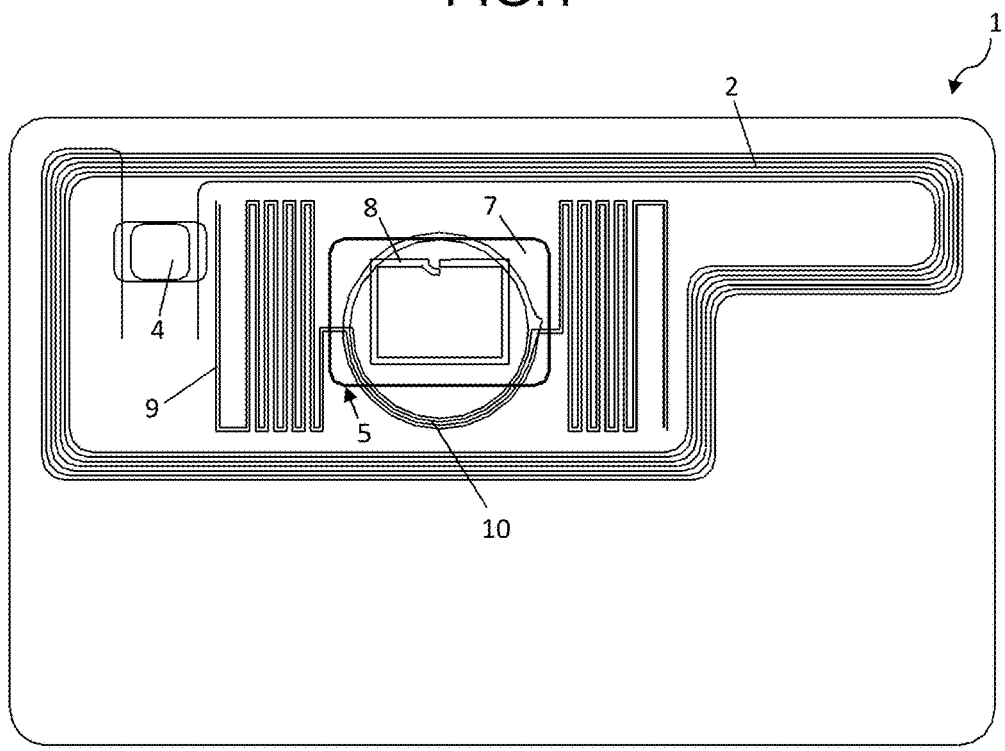
FIG. 2 illustrates a second example of a prior art device.

In the exemplary embodiment illustrated in FIG. 3, the HF part of the previously described devices of FIGS. 1 and 2 is kept with the antenna 12 and the chip or chip module 14.

In addition with respect to the devices of FIGS. 1 and 2, the antenna 12 is modified to include the secondary antenna 18 suitable for an inductive coupling with the UHF chip or chip module 15 according to the principle described above. The entire HF tag is now working as a booster for the UHF module 15, in similar way as the booster 3 described above. The integrated antenna 17 of the UHF module 15 is inductively connected to the secondary antenna 18. The rest of the antenna 12 forms the said booster to communicate with a long range reader, wherein the internal capacity of the HF chip 14 is used to tune the resonance frequency of the entire system.

Therefore, one primary advantage of this invention is the use of an active tag (wherein chip 14 can communicate to a reader via the antenna 12) as a booster for the module 15 (with antenna 17), and to need only one long range antenna (the antenna 12) for the communication with the reader of both chips 14 and 15.

Although in this configuration the read range properties of the UHF part are long as that of the one of FIG. 1, the read range properties are still interesting and useful. The inventors have implemented a HF/UHF configuration similar to that shown in FIG. 3 in which an INFINEON SLE77 56 pF chip operating a 15.3 MHz was used for the first chip 14 and a Monza R6 chip operating in the frequency range of 870 to 900 MHz was used for the second chip 15. Such a configuration produced a measured distance range of detection of about 50 mm for the HF INFINEON SLE77 56 pF chip operating a 15.3 MHz while a measured distance range of detection of about 6 to 7 m for the UHF Monza R6 chip operating in the frequency range of 870 to 900 MHz was measured.

Figure 4:
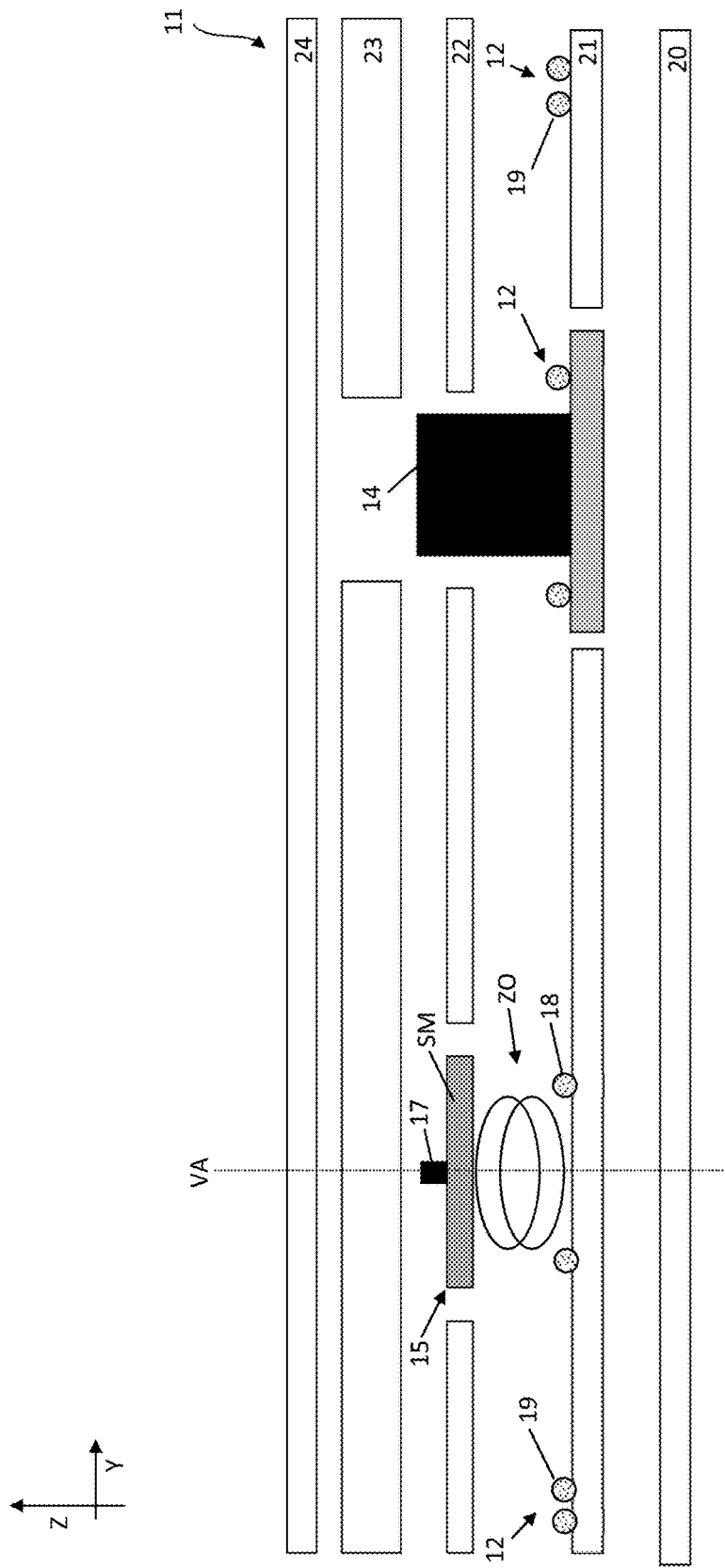
FIG. 4 illustrates a schematical exploded side view of the embodiment of FIG. 3.

FIG. 4 shows an exploded side view of a transponder according to the principle of the present invention implanted in, for example, a card structure as transponder. The card typically comprises several layers 20 to 24 as is common in the art of RFID devices. On layer 21 the antenna 12 is placed (for example by wire embedding) and the chip or module 15 is inductively coupled to the antenna 12 via secondary antenna 18. The other chip or module 14 is electrically connected to the antenna 12, for example via soldering or another technique usual in the art of RFID.

As mentioned above, the electrically connected chip or module 14 is used for HF communications and the inductively coupled chip or module 15 for UHF communications. Alternatively, other frequency combinations are possible, for example HF-HF, that is each chip or chip module is used for HF communications.

Figure 5:
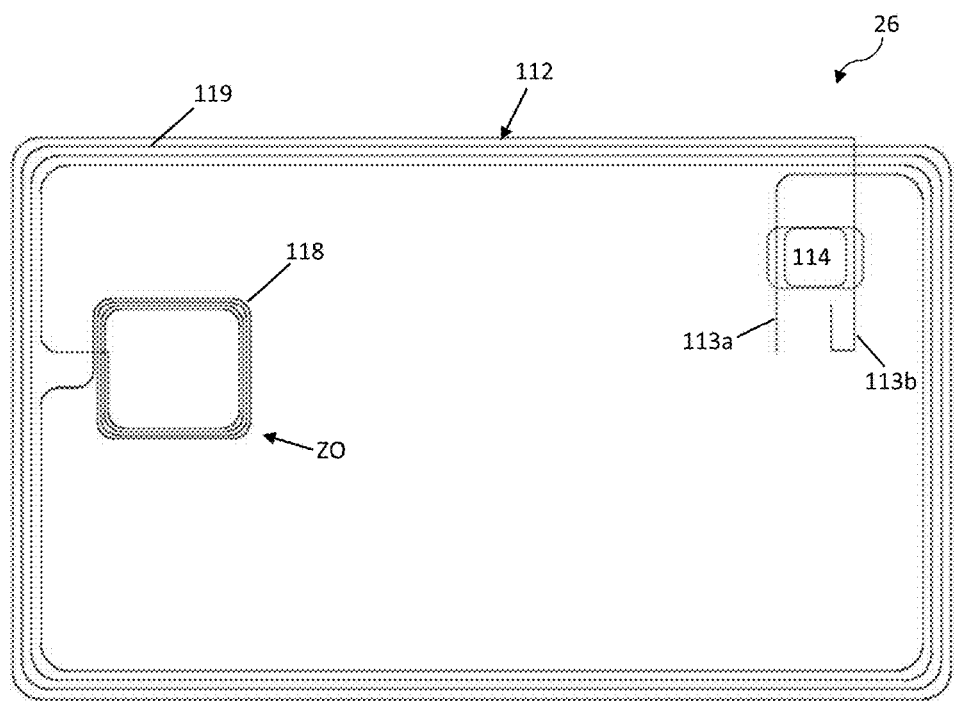
FIG. 5 is a schematic top view of another embodiment according to another aspect of the present invention.

FIG. 5 partially illustrates a transponder 26 according to another aspect of the present invention in which first and second chips 114, 115 are both configured for HF communication with an external reader (not illustrated). The second chip 115 is not illustrated to permit the secondary antenna 118 to be clearly visible in FIG. 5.

Like the embodiment of FIG. 3, the first antenna 112 comprises a principal section 119 and the secondary antenna 118. The secondary antenna 118 extends continuously from the principal section 119 to an inductive connection or coupling zone ZO at which the secondary antenna 118 is inductively connected to a second antenna 117 associated with second chip 115 (not-illustrated).

The difference between the configuration of FIG. 5 and FIG. 3 lies in the fact that the secondary antenna 118 defines an antenna structure or layout that allows a more optimum inductive connection or coupling between the integrated antenna of the HF chip 15 and the secondary antenna 118. The secondary antenna 118 defines a spiral structure (for example, substantially rectangular) defining of smaller area than that defined by the principal section 119. The spiral of the exemplary illustrated secondary antenna 118 is also formed using a shorter pitch than that of the principal section 119.

As mentioned above, preferably, the structure (geometry and/or dimensions) defined by the antenna 117 of the second chip 115 is as similar as possible to the structure of the coupling portion defined by the secondary antenna 118. When the antenna 117 is positioned over the coupling portion of the secondary antenna 118, the antenna material of the antenna 117 and the secondary antenna 118 preferably extend at the smallest possible spacing difference from one another in order to optimize inductive coupling between them.

As also mentioned above, this nevertheless does not mean that the design of the antenna 117 and of the secondary antenna 118 should be absolutely identical.

As in FIG. 3, the first antenna 112 thus includes the primary antenna 119 configured for communication with an external RFID reader by the first chip 114. The secondary antenna 118 is connected in series to the primary antenna 119, where the secondary antenna 118 is configured to be inductively coupled to the second antenna 117 that is connected to the chip 115 which is thus also configured for communication with an external RFID reader.

The inventors have implemented a HF/HF configuration similar to that shown in FIG. 5 in which an Inside secure iClass 32 k chip operating a 13 MHz was used for the first chip 114 and a INFINEON SLJ52GDL080CL chip operating in the frequency range of 16 MHz was used for the second chip 115. Such a configuration produced a measured distance range of detection of about 50 mm for the Inside secure iClass 32 k chip operating a 13 MHz while a measured distance range of detection of about 40 mm for the HF INFINEON SLJ52GDL080CL chip operating in the frequency range of 16 MHz was measured.

The present invention has many advantages in particular it allows an optimization of the space management on the transponder as in the configuration of FIG. 2 but at the same time it avoids the interference of a faraday cage that is created in the configuration of FIG. 2. Such space made available thanks to the present invention permits further information or components to be included on or in the transponder or device. For example, a magnetic band can be added to this now available space or additionally or alternatively, this available space can be used to emboss user information onto the transponder. This is particularly useful when the transponder forms a card such as a bank card or a payment card.

The present invention also has the advantage of simplicity as only one antenna is necessary which simplifies the construction.

The embodiments described in the present specification are given as non-limiting examples and variations are possible within the scope of protection. For example, equivalent means may be used.

Also the present principle is not limited to cards such as smart cards but can be applied to any suitable RFID transponder.

The described transponder advantageously forms two operative tags with the first chip 14 and the first antenna 12 forming a first operative tag able to communicate with an external reader and the second chip 15 and the second antenna 17 forming a second operative tag able to communicate with an external reader through inductive coupling with the first tag.

Both operative tags may combine different communication modes such as HF and UHF communication modes, but other modes are also possible with the described features of the present invention, for example, HF-HF communication modes.

The first and second tag may communicate at the same resonance frequency with external readers or they may communicate at different resonance frequencies with external readers, in any of the above mentioned communication modes.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. An RFID transponder, comprising a first chip directly electrically connected to a first antenna and a second chip electrically connected to a second antenna, wherein the first antenna comprises a primary antenna and a secondary antenna, the secondary antenna inductively connected to the second antenna, wherein the first chip is able to tune the resonant frequency of the primary antenna, the secondary antenna, and the second antenna.

2. The RFID transponder of claim 1, wherein the secondary antenna inductively connected to the second antenna and the primary antenna are configured to operate as a booster antenna for the second chip.

3. The RFID transponder of claim 1, wherein said secondary antenna forms a loop antenna separated from the primary antenna and electrically connected in series with the primary antenna.

4. The RFID transponder of claim 1, wherein both chips are used for HF communication.

5. The RFID transponder of claim 1, wherein one of the chips is used for UHF communication.

6. The RFID transponder of claim 5, wherein the second chip is used for UHF communication.

7. The RFID transponder of claim 1, wherein the first chip and the primary antenna form a first operative tag able to communicate with an external reader.

8. The RFID transponder of claim 7, wherein the second chip and the second antenna form a second operative tag able to communicate with an external reader through inductive coupling with the first tag.

9. The RFID transponder of claim 8, wherein the first and second tags are communicating at the same resonance frequency with one or more external readers.

10. The RFID transponder of claim 8, wherein the first and second tags are communicating at different resonance frequencies with one or more external readers.

11. An RFID transponder, comprising:
a carrier having multiple layers;
a first chip affixed to a layer of the carrier;
a first antenna affixed to a layer of the carrier and electrically connected to the first chip, the first antenna including a primary antenna and a secondary antenna in series with the primary antenna, the secondary antenna defining a first area;
a second chip affixed to a layer of the carrier; and
a second antenna affixed to a layer of the carrier and electrically connected to the second chip, the second antenna defining a second area;
wherein the first and second areas at least partially overlap, and the secondary antenna and the second antenna are separated by separation material; and
wherein the first chip is able to tune the resonant frequency of the primary antenna, the secondary antenna, and the second antenna.

12. The RFID transponder of claim 11, wherein the first antenna and second antenna are affixed to different layers from one another.

13. The RFID transponder of claim 11, wherein the first area and second area have different geometric shapes.

14. The RFID transponder of claim 11, wherein the primary antenna and the secondary antenna are wire windings with different pitches.

15. The RFID transponder of claim 11, wherein the first chip is affixed to a first layer of the card, and the second chip is affixed to a second layer of the card which is different from the first layer.

16. An RFID transponder, comprising:
a carrier;
a first chip attached to the carrier;
a first antenna attached to the carrier and directly electrically connected to the first chip, the first antenna including a primary antenna and secondary antenna;
a second chip attached to the carrier; and
a second antenna attached to the carrier, electrically connected the second chip and inductively coupled to the secondary antenna;
wherein the first chip is able to tune the resonant frequency of the primary antenna, the secondary antenna and the second antenna.

17. The RFID transponder of claim 16, wherein the primary antenna and the secondary antenna are wire windings with different pitches.

18. The RFID transponder of claim 16, wherein the secondary antenna physically overlaps at least a portion of the second antenna.

19. The RFID transponder of claim 18, further comprising a separation material disposed between the secondary antenna and the second antenna.

* * * * *